United States Patent [19]
Lloyd et al.

[11] Patent Number: 5,548,752
[45] Date of Patent: Aug. 20, 1996

[54] METHOD AND SYSTEM FOR STORING DATA IN A MEMORY DEVICE

[75] Inventors: Scott E. Lloyd, Hoffman Estates; Shay-Ping T. Wang, Long Grove, both of Ill.

[73] Assignee: Motorola, Inc., Schaumburg, Ill.

[21] Appl. No.: 288,673

[22] Filed: Aug. 10, 1994

[51] Int. Cl.⁶ ............................. G06F 7/00; G06F 13/00
[52] U.S. Cl. ..................... 395/600; 395/650; 395/800; 395/410; 364/246; 364/964; 364/DIG 1; 364/DIG. 2
[58] Field of Search ............................. 395/600, 425, 395/872, 884, 894, 650, 800; 364/200

[56] References Cited

U.S. PATENT DOCUMENTS

| | | | |
|---|---|---|---|
| 4,037,093 | 7/1977 | Gregg et al. | 235/164 |
| 4,645,461 | 2/1987 | Mortensen | 434/188 |
| 4,939,641 | 7/1990 | Schwartz et al. | 364/200 |
| 5,068,816 | 11/1991 | Noetzel | 364/718 |
| 5,122,984 | 6/1992 | Strehler | 365/49 |
| 5,148,292 | 9/1992 | Kutaragi | 358/433 |
| 5,287,326 | 2/1994 | Hirata | 395/230.03 |
| 5,301,155 | 4/1994 | Wada et al. | 365/20 |
| 5,377,353 | 12/1994 | Yamaguchi | 395/650 |

Primary Examiner—Thomas G. Black
Assistant Examiner—C. Pham
Attorney, Agent, or Firm—Bruce E. Stuckman; Michael K. Lindsey

[57] ABSTRACT

A method for storing data in a memory device is provided. The method stores blocks of data elements in a two-dimensional address space such that the blocks overlap in the address space. The data elements may be digital words which represent exponents of a polynomial expansion.

33 Claims, 7 Drawing Sheets

METHOD AND SYSTEM FOR STORING DATA IN A MEMORY DEVICE

RELATED INVENTIONS

The present invention is related to the following inventions which are assigned to the same assignee as the present invention:

(1) "Neural Network and Method of Using Same", having Ser. No. 08/076,601 filed Jun. 14, 1993.

(2) "Method for Memory Space Optimization", having Ser. No. 08/304,008, filed on Sep. 9, 1994.

The subject matter of the above-identified related inventions is hereby incorporated by reference into the disclosure of this invention.

TECHNICAL FIELD

This invention relates generally to data storage systems and, in particular, to a method and system for storing data in a memory device.

BACKGROUND OF THE INVENTION

Data storage systems are widely used in a variety of computing environments. FIG. 1 shows a computer (10) which includes a data storage system (14). Typically, a data storage system includes a mass storage (16), a memory management unit (22), and a CPU memory (24). The central processing unit (CPU) (12) executes software programs and is connected to memory management unit (22) and CPU memory (24) via bus (20).

Memory management unit (22) controls the transfer of data between mass storage (16) and CPU memory (24), and in some instances it may transfer data between central processing unit (12) and mass storage (16). To move data from mass storage (16) to CPU memory (24), memory management unit (22) reads data blocks from mass storage (16) using bus (18) and then writes the data blocks to CPU memory (24) using bus (20). In a similar fashion, memory management unit (22) may move data blocks from CPU memory (24) to mass storage (16) by first reading the data blocks from CPU memory (24) and then writing them to mass storage (16).

Mass storage (16) typically provides a means for storing large quantities of data at relatively low cost per stored data element. One of ordinary skill in the art will realize that mass storage (16) may comprise a hard disk, an array of random access memory (RAM) chips, or other storage media.

CPU memory (24) stores data and program instructions which are used by CPU (12). One of ordinary skill in the art will understand that CPU memory (24) may be a static or cache RAM which resides on the same integrated circuit as CPU (12). The data stored in CPU memory (24) is accessed by CPU (12) across bus (20). CPU memory (24) allows quicker access to stored data than mass storage (16). However, CPU memory (24) is generally small due to the relatively high cost associated with memory capable of short access times. CPU memory (24) is generally not large enough to store all of the data needed by CPU (12) during operation. Thus, either CPU (12) must periodically access data from mass storage (16) through memory management unit (22), or memory management unit (22) must periodically update the contents of CPU memory (24). Since mass storage (16) is slower than CPU memory (24), CPU (12) must insert wait states while accessing data from mass storage (16). The insertion of wait states by CPU (12) decreases the overall performance of computer (10). Additionally, in many situations the amount of time required by memory management unit (22) to load data blocks into CPU memory (24) causes CPU (12) to idle, which also decreases the performance of computer (10).

Therefore, there is a significant need for a data storage system which allows data blocks to be stored in a manner that reduces the overall required size of the memory. There is also a need for a data storage system which reduces the time needed to load data into the memory and reduces the swapping of data blocks between the memory and mass storage.

SUMMARY OF INVENTION

It is thus an advantage of the present invention is to provide a method for reducing the amount of memory space needed to store data in a memory device.

Another advantage of the present invention to provide a method of storing data which significantly reduces the amount of time needed to load data into the memory device.

A further advantage of the present invention is that a method is provided which lessens the need to swap data blocks between a memory device and a mass storage device.

In one embodiment of the present invention there is provided a method for storing a plurality of data blocks in a memory device. In this method, each of the data blocks has a plurality of data elements. It is first determined if a common data element exists between two of the plurality of data blocks. The plurality of data blocks are then stored in the memory device such that if the common data element exists between the two of the plurality of data blocks, the common data element of the two of the plurality of data blocks is stored in a single area in the memory device.

In an alternative embodiment of the present invention, a method for storing a plurality of data blocks in a memory device is provided. Each of the plurality of data blocks has an origin address and a plurality of addressable data elements, and each of the plurality of data elements has an address which is relative to the origin address. Further, the plurality of data blocks include a first and second adat block. The method assigns the origin addresses to the first data block and the second data block such that at least one of the plurality of data elements of the second data block has the same address as at least one of the plurality of data elements of the first data block. The method determines whether the at least one of the plurality of data elements of the first and second data blocks having the same address are equal. If the data elements are equal, the method creates an overlap record which includes the origin address of the second data block and the number of common data elements between the first and second data blocks. The origin address of the second data block is then changed and the steps are repeated until the greatest number of common data elements is found. The first data block is then stored at the assigned origin address. The second data block is stored at the origin address given by the overlap record with the greatest number of common elements.

In a further embodiment of the present invention, a memory management unit is provided for storing a plurality of data blocks in the memory device of a computer. The memory management unit includes determining means for determining if a common data element exists between two of the plurality of data blocks. In addition, the memory management unit includes storing means operatively coupled to the memory device and responsive to the determining means, for storing the plurality of data blocks in the memory device such that if the common data element exists between the two of the plurality of data blocks, the common data element of the two of the plurality of data blocks is stored in a single area in the memory device.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

It will be understood by one of ordinary skill in the art that the methods of the present invention may be implemented in hardware or software, or any combination thereof, and that the terms, "exponent", and "exponent value", as well as the terms, "block", and "data block", are used interchangeably in this description.

Figure 1:
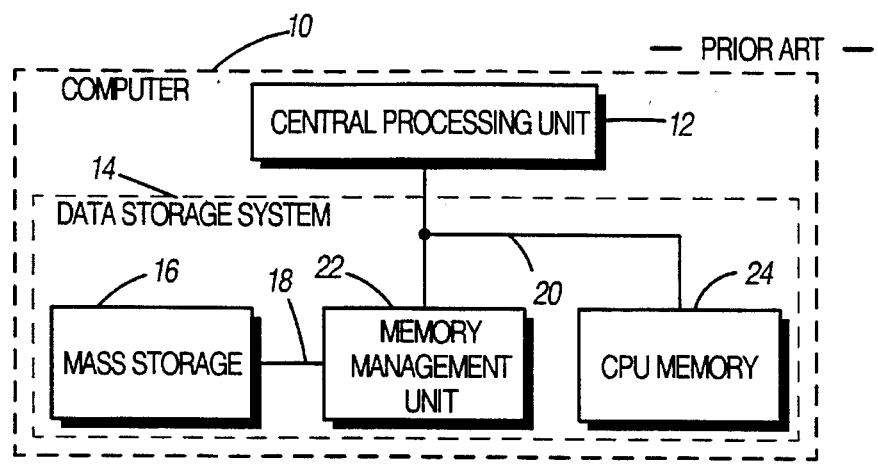
FIG. 1 shows a block diagram of a prior art computer which includes a data storage system.
Figure 2:
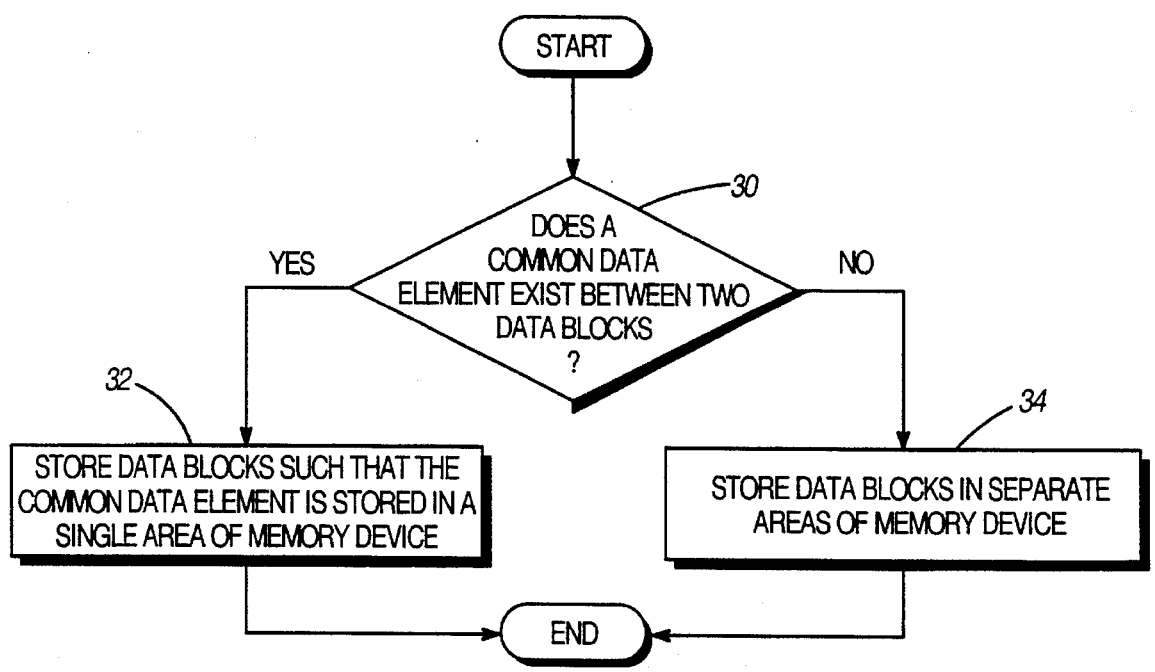
FIG. 2 shows a flow diagram of a method of storing data in a memory device in accordance with one embodiment of the present invention.

FIG. 2 shows a flow diagram of a method of storing two of a plurality of data blocks in a memory device in accordance with one embodiment of the present invention. First, in decision box (30), a determination is made whether a common data element exists in two of the data blocks. If so, the method proceeds to box (32). If not, the method proceeds to box (34).

In box (32), the two data blocks are stored such that the common data element is stored in a single location in the memory device. In this case, less memory is required to store the two data blocks than would be required if the blocks were stored separately, due to the overlap between the two data blocks. The use of less memory, in turn, can lessen the need to swap data blocks between a memory device and a mass storage device.

In box (34), the data blocks are stored in separate, non-overlapping areas of the memory device.

Figure 3:
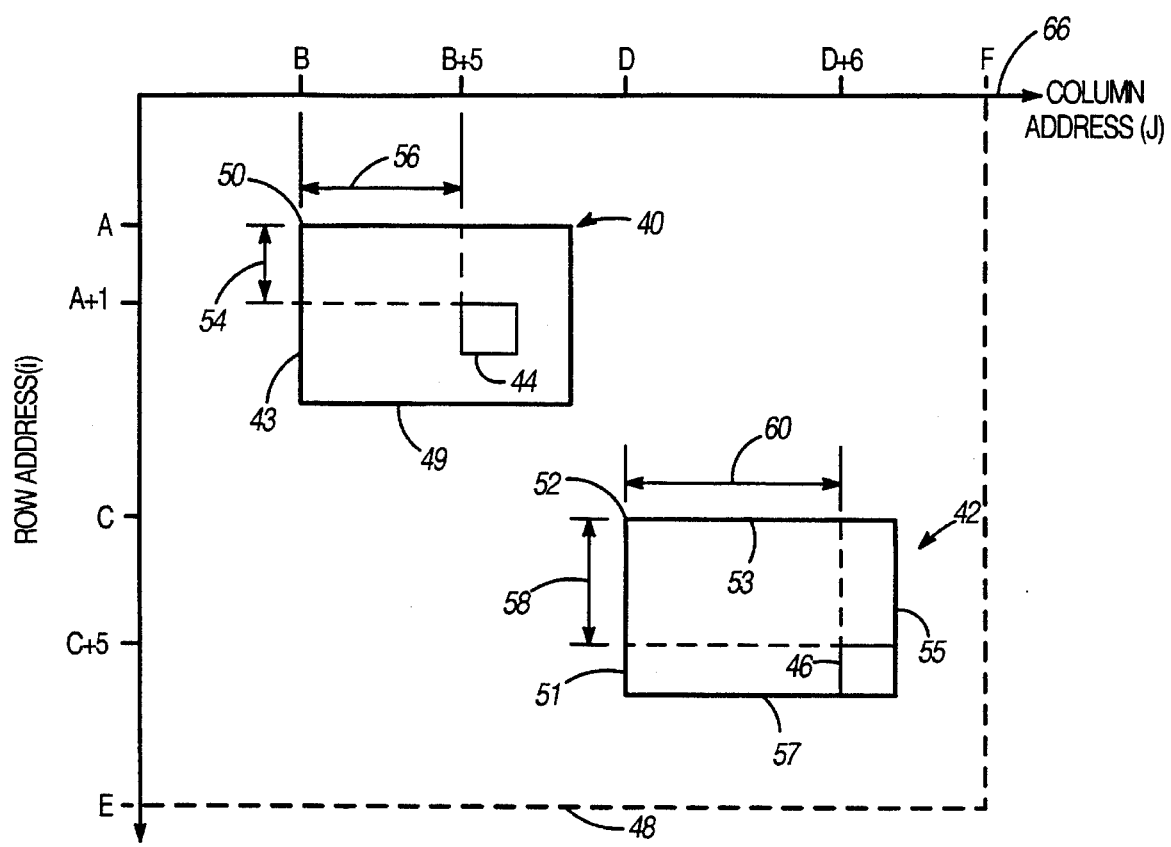
FIG. 3 illustrates an example of a two-dimensional addressing scheme which is used to locate data in a memory device.

FIG. 3 illustrates an example of a two-dimensional addressing scheme which is used to locate data in a memory device. In an embodiment, addresses in a memory device are represented by an array which has two indices: a row address and a column address. Thus, a two-dimensional address may be represented as an ordered pair $(i, j)$, where i represents the row address and j represents the column address. A data element may be stored at each two-dimensional address in the memory device.

Axis (64) represents values of the row address, while axis (66) represents values of the column address. Boundary (48) indicates the memory space of a memory device. A data element may be stored anywhere within the memory space of a memory device. In other words, the two-dimensional address of a data element stored within boundary (48) may be given by $(i, j)$, where $0 \leq i \leq f$, and $0 \leq j \leq e$.

Data block (40) comprises a plurality of data elements, one of which is shown as data element (44). Data block (40) is referenced by two-dimensional origin address (50). Origin address (50) gives the location of the first data element of data block (40). The first data element is accessed before other data elements of the block. Origin address (50) is given by the ordered pair $(a, b)$. All other data elements within a data block are located at addresses which are relative to the origin address of the data block. For example, the row address of data element (44) is given by the sum of row offset (54) and the row address of origin address (50), and the column address of data element (44) is given by the sum of column offset (56) and the column address of origin address (50). In the example, row offset (54) equals one location and column offset (56) equals five locations. Thus, the resulting two-dimensional address of data element (44) is $(a+1, b+5)$.

Data block (42) is referenced by origin address (52) which is represented by the ordered pair $(c, d)$. Maximum row offset (58) and maximum column offset (60) give the two-dimensional address of data element (46) relative to origin address (52). The maximum row offset and maximum column offset represent the relative address of the last data element of a data block to be accessed. For example, maximum row offset (58) is equal to five locations and maximum column offset (60) is equal to six locations. Thus the resulting two-dimensional address for data element (46) is $(c+5, d+6)$.

Figure 4:
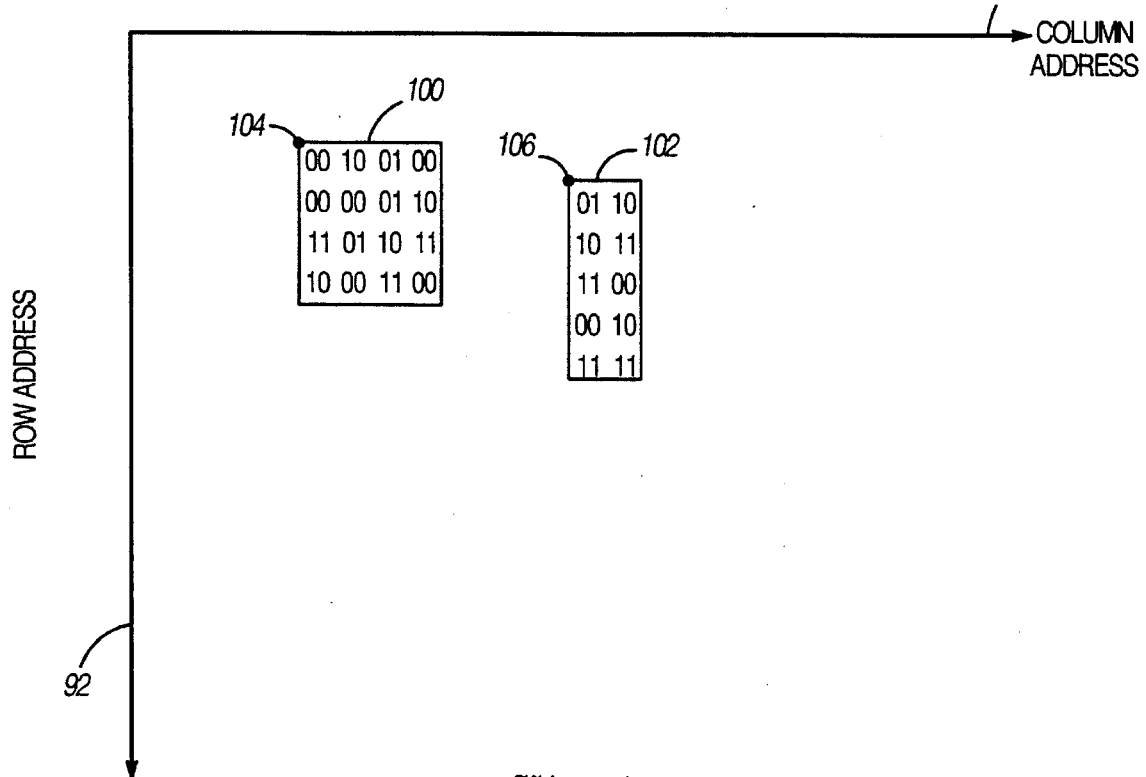
FIG. 4 illustrates an example of two data blocks located in non-overlapping areas of a two-dimensional address space.

FIG. 4 illustrates an example of two data blocks located in non-overlapping areas of a two-dimensional address space. Data block (100) includes sixteen two-bit digital words and is referenced by origin address (104). Data block (102) includes ten two-bit digital words and is referenced by origin address (106). Axis (90) indicates the column address and axis (92) indicates the row address of the two-dimensional address space.

Figure 5:
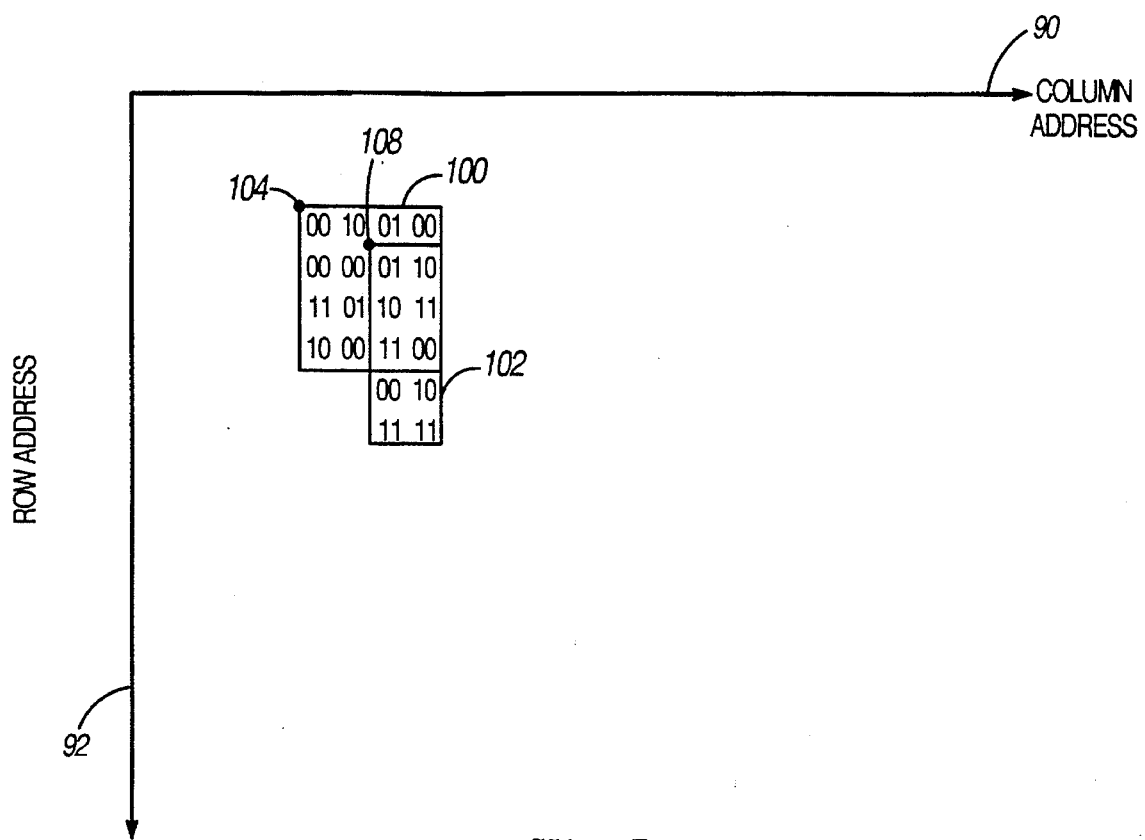
FIG. 5 illustrates an example of the two data blocks of FIG. 4 located in overlapping areas of a two-dimensional address space in accordance with one embodiment of the present invention.

FIG. 5 illustrates an example of the two data blocks of FIG. 4 located in overlapping areas of a two-dimensional address space in accordance with one embodiment of the present invention. Data block (100) remains at the location given by origin address (104). However, data block (102) is moved to new origin address (108). The new location of data block (102) allows data elements from both blocks having the same value, or common data elements, to share the same two-dimensional addresses. In FIG. 5, the common data elements are two-bit digital words.

By overlapping data blocks such that common data elements are located at the common two-dimensional addresses, the present invention reduces the amount of memory space required to store one or more data blocks.

FIGS. 4 and 5 illustrate two-bit data elements for purposes of example. Further, FIGS. 4 and 5 each are described in terms of two-dimensional addressing. One with ordinary skill in the art will recognize that data elements containing any arbitrary number of bits could be used and that addressing could be performed in an n-dimensional sense.

Figure 6:
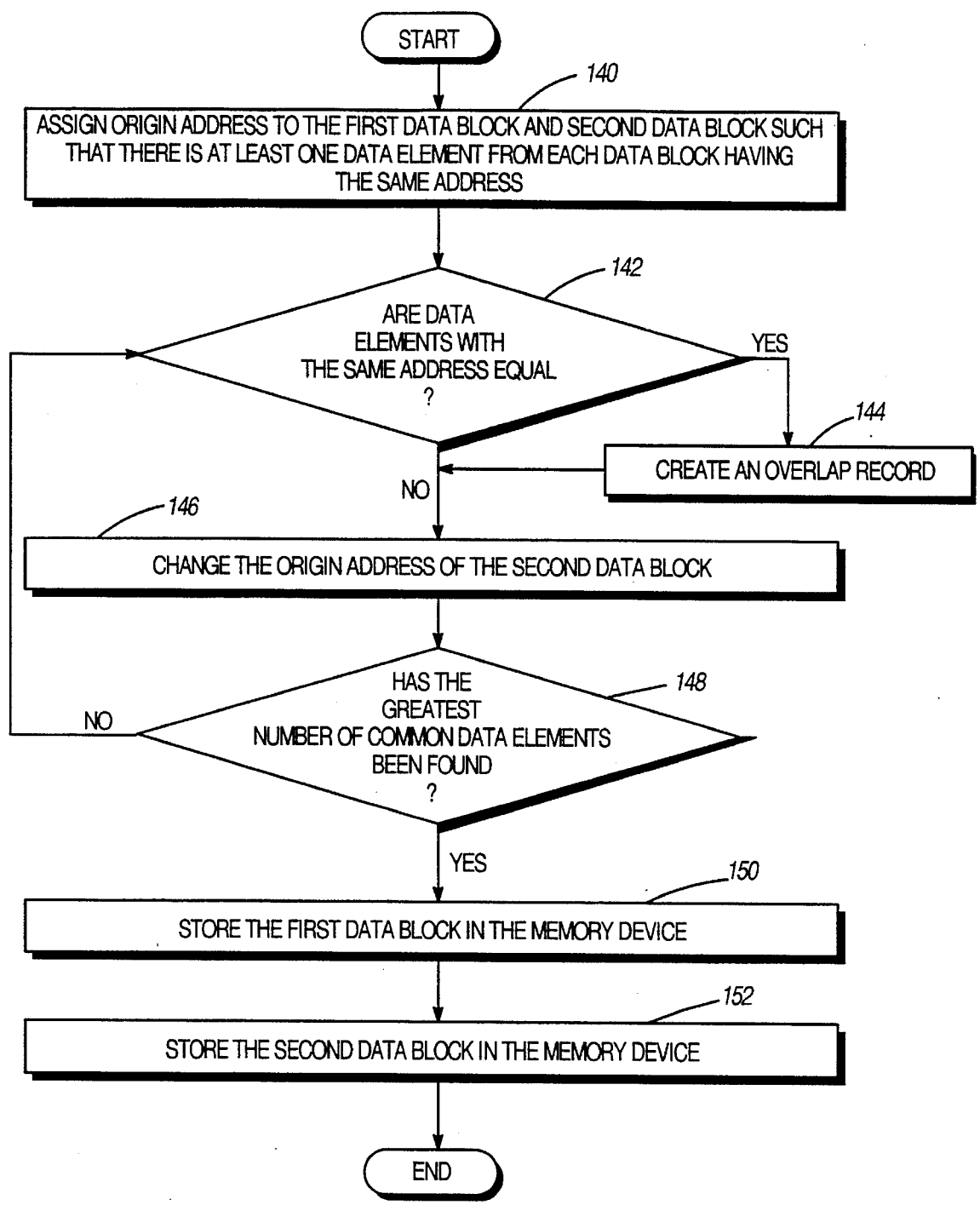
FIG. 6 shows a flow diagram of a method of storing two of a plurality of data blocks in a memory device in accordance with an alternative embodiment of the present invention.

FIG. 6 shows a flow diagram of a method of storing two of a plurality of data blocks in a memory device in accordance with an alternative embodiment of the present invention. In box (140), origin addresses are assigned to the two data blocks such that the two data blocks overlap in two-dimensional address space; in other words, at least one of the data elements of the first of the two data blocks has the same two-dimensional address as at least one of the data elements of the second of the two data blocks.

Next, in decision box (142) a check is made to determine whether data elements having the same address are equal. If so, the method proceeds to box (144). If not, the method proceeds to box (146).

In box (144), an overlap record is created. The overlap record may be a software variable or a hardware means for storing data. The overlap record stores the origin address of the second data block and the number of common data elements. The method generates a plurality of overlap records.

In box (146), the origin address of the second data block is changed to allow different data elements of the two blocks to share the same address.

Next, in box decision box (148), a check is made to determine whether the greatest number of common data elements has been found between the two data blocks. This is done by comparing the overlap records to find the one with the greatest number of common data elements. The comparison of overlap records requires that the first and second data blocks have been previously overlapped in every possible way. If the data blocks have been overlapped in every possible way, then the method proceeds to box (150). If not, the method returns to box (142).

In box (150), the first data block is stored in the memory device at the origin address assigned in box (140). The data elements of the first data block are stored in the memory device at two-dimensional addresses which are relative to the assigned origin address.

In box (152), the first data block is stored in the memory device at the origin address given by the overlap record with the greatest number of common elements. The data elements of the second data block are stored in the memory device at two-dimensional addresses which are relative to the origin address given by the overlap record.

Figure 7:
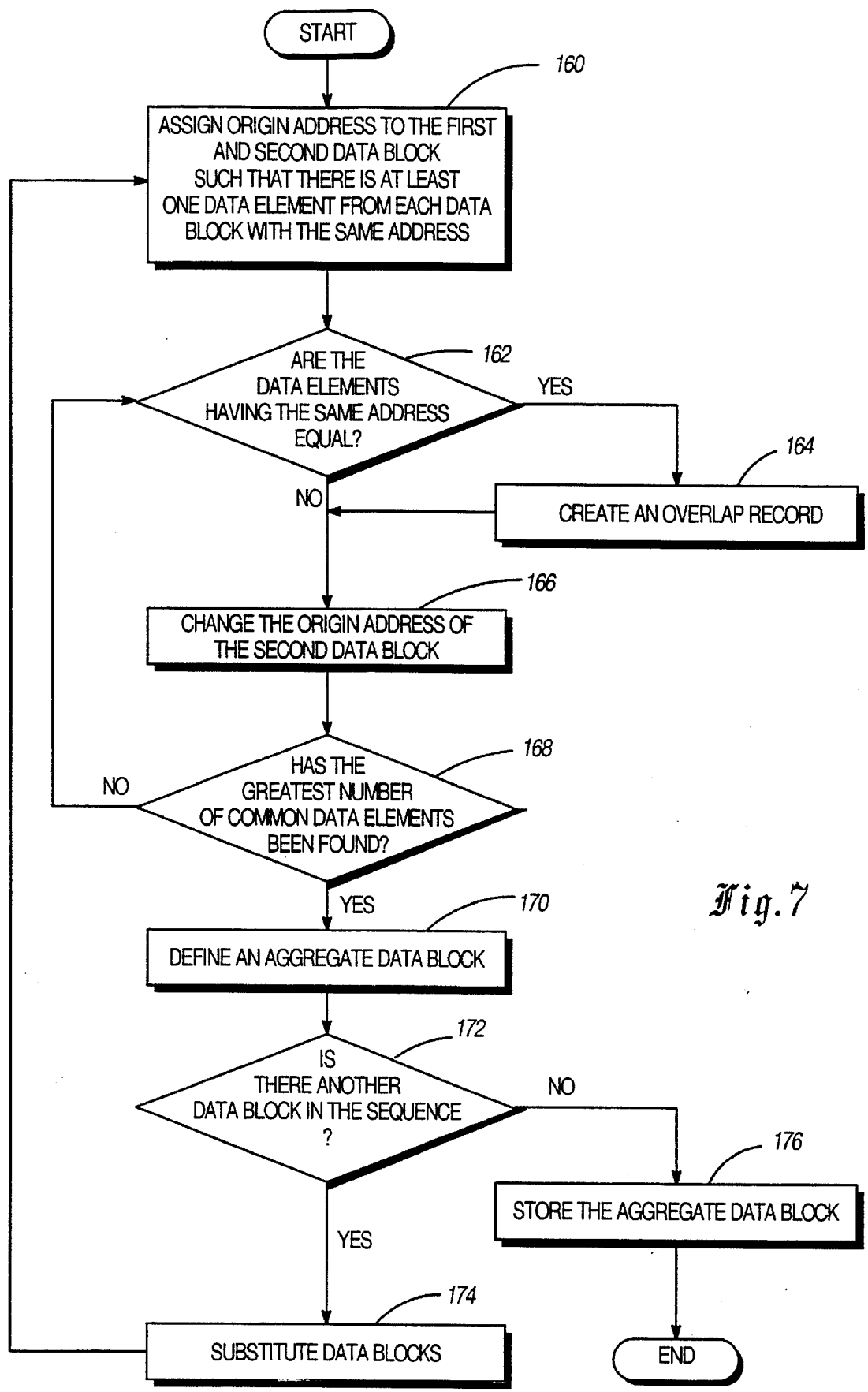
FIG. 7 shows a flow diagram of a method of storing a sequence of data blocks in a memory device in accordance with a further embodiment of the present invention.

FIG. 7 shows a flow diagram of a method of storing a sequence of data blocks in a memory device in accordance with a further embodiment of the present invention. Data blocks may be ordered in the sequence in various ways. For instance, the sequence may be ordered starting with the block having the fewest data elements to the block having the greatest number of data elements. Or the data blocks may be randomly ordered in the sequence. In a preferred embodiment, the sequence is ordered in decreasing data block size; that is, the sequence starts with the block having the greatest data elements and ends with the block having the fewest number of data elements.

In box (160), origin addresses are assigned to the first data block and a second data block in the sequence such that the two data blocks overlap in address space; in other words, at least one of the data elements of the first data block has the same address as at least one of the data elements of the successive data block.

Next, in decision box (162) a check is made to determine whether data elements having the same address are equal. If so, the method proceeds to box (164). If not, the method proceeds to box (166).

In box (164), an overlap record is created. The overlap record may be a software variable or a hardware means for storing data. The overlap record stores the origin address of the second data block and the number of common data elements. The method generates a plurality of overlap records.

In box (166), the origin address of the second data block is changed to allow different data elements of the first and second blocks to share the same address.

Next, in decision box (168), a check is made to determine whether the greatest number of common data elements has been found between the two data blocks. This is done by comparing the overlap records to find the one with the greatest number of common data elements. The comparison of overlap records requires that the first and second data blocks have been previously overlapped in every possible way. If the data blocks have been overlapped in every possible way, then the method proceeds to box (170). If not, the method returns to box (162).

In box (170), an aggregate data block is defined. The aggregate data block includes the first data block having the origin address assigned in box (160) and the second data block having the origin given by the overlap record with the greatest number of common data elements. The data elements of the first and successive data blocks have two-dimensional addresses which are relative to the origin address of their respective data block.

In decision box (172), a check is made to determine whether there is another data block in the sequence of data blocks. If so, the method proceeds to box (174). If not, the method proceeds to box (176).

In box (174), the aggregate data block is substituted for the first data block, and the next data block in the sequence is substituted for the second data block. Upon exiting box (174), the method returns to box (160).

In box (176), the aggregate data block which includes all of the data blocks in the sequence is stored in the memory device.

Figure 8:
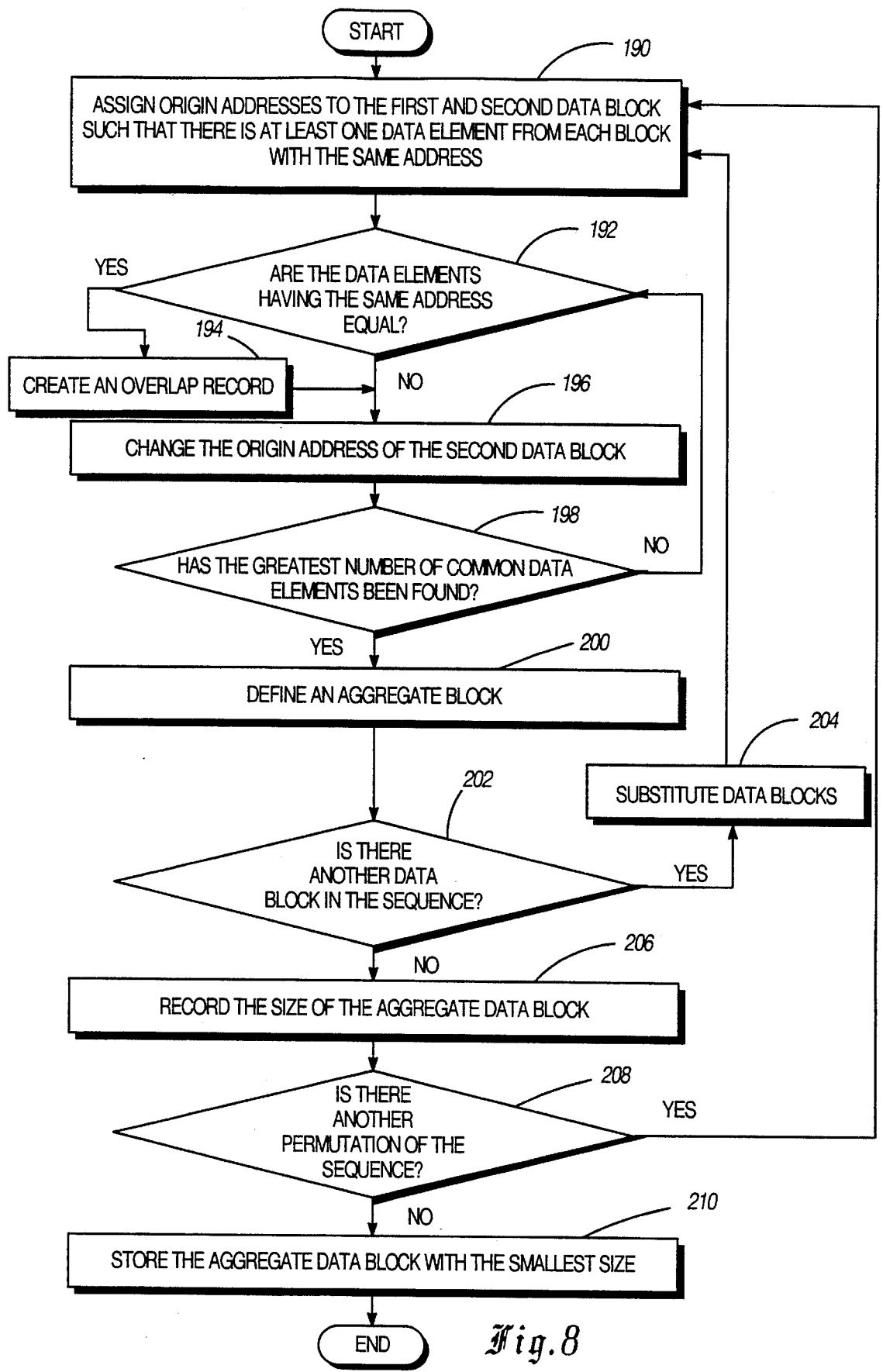
FIG. 8 shows a flow diagram of a method, in accordance with an additional embodiment of the present invention, of storing a permutation of a sequence of data blocks which requires the least amount of memory.

FIG. 8 shows a flow diagram of a method, in accordance with an additional embodiment of the present invention, of storing a permutation of a sequence of data blocks which requires the least amount of memory. In this embodiment, all possible orders of the sequence of data blocks are compared and the order, or permutation, which requires the least amount of memory space is stored in the memory device. In box (190), origin addresses are assigned to the first data block and a successive data block in the sequence such that the two data blocks overlap in address space; in other words, at least one of the data elements of the first data block has the same address as at least one of the data elements of the successive data block.

Next, in decision box (192) a check is made to determine whether data elements having the same address are equal. If so, the method proceeds to box (194). If not, the method proceeds to box (196).

In box (194), an overlap record is created. The overlap record may be a software variable or a hardware means for storing data. The overlap record stores the origin address of the second data block and the number of common data elements. The method generates a plurality of overlap records.

In box (196), the origin address of the second data block is changed to allow different data elements of the first and second blocks to share the same address.

Next, in box decision box (198), a check is made to determine whether the greatest number of common data elements has been found between the two data blocks. This is done by comparing the overlap records to find the one with the greatest number of common data elements. The comparison of overlap records requires that the first and second data blocks have been previously overlapped in every possible way. If the data blocks have been overlapped in every possible way, then the method proceeds to box (200). If not, the method returns to box (192).

In box (200), an aggregate data block is defined. The aggregate data block includes the first data block having the origin address assigned in box (190) and the second data block having the origin given by the overlap record with the greatest number of common data elements. The data elements of the first and second data block have two-dimensional addresses which are relative to the origin address of their respective data block.

In decision box (202), a check is made to determine whether there is another data block in the sequence of data blocks. If so, the method proceeds to box (204). If not, the method proceeds to box (206).

In box (204), the aggregate data block is substituted for the first data block, and the next data block in the sequence is substituted for the second data block. Upon exiting box (204), the method returns to box (190).

In box (206), the amount of memory required to store an aggregate data block which includes all of the data blocks in the sequence is stored. The method records the required amount of memory, or size, of an aggregate data block for each permutation of the sequence.

In decision box (208), a check is made to determine whether there is another permutation of the sequence of data blocks. If so, the method returns to box (190), otherwise the method proceeds to box (210).

In box (210), a comparison is made between the sizes of the aggregate data blocks. The aggregate data block requiring the least amount of memory space is then stored in the memory device.

Figure 9:
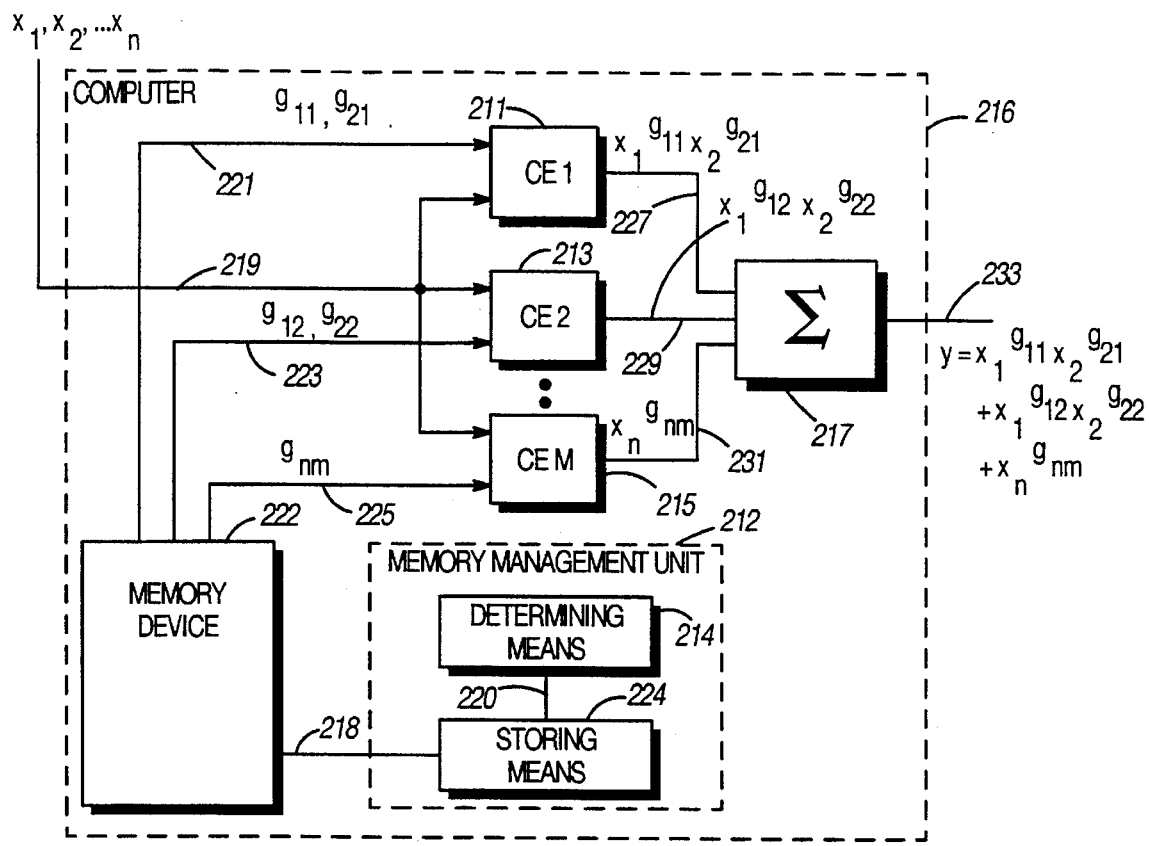
FIG. 9 shows a block diagram of a multiprocessor computer which includes a memory management unit of one embodiment of the present invention.

FIG. 9 shows a block diagram of a multiprocessor computer which includes a memory management unit of one embodiment of the present invention. Computer (216) includes memory device (222), memory management unit (212), summing circuit (217), and a plurality of computing elements, three of which are shown as computing elements (211), (213), and (215).

Computer (216) is used to compute polynomial expansions of the form:

$$y = \sum_{i=1}^{m} x_1^{g_{1i}} x_2^{g_{2i}} \ldots x_n^{g_{ni}} \qquad \text{Equation 1}$$

where y represents the output of computer (216), which may also be referred to as a dependent variable of the polynomial expansion; where $x_1, x_2, \ldots, x_n$ represent data inputs to computer (216), which may also be referred to as independent variables of the polynomial expansion; and where $g_{1i}, \ldots, g_{ni}$ represent the exponents for the ith term in the expansion which are applied to the data inputs; and where i, m, and n are integers.

A polynomial expansion is computed by computer (216) in the following manner. A plurality of data inputs $x_1, x_2, \ldots, x_n$ are fed into computer (216) using bus (219) and then distributed to the plurality of computing elements, of which computing elements (211), (213), and (215) are illustrated. It should be understood that additional computing elements (not shown) could be provided to implement each of the terms of the polynomial expansion presented in Equation (1) above. Each computing element computes a term in the polynomial expansion and determines which of the data inputs to receive. The computing elements access exponent values which are stored in memory device (222). After computing a term, a computing element passes the term to summing circuit (217) which sums the terms computed by the computing elements and places the sum on computer output (233).

For example, FIG. 9 depicts the computation of the polynomial $y = x_1^{g_{11}} x_2^{g_{21}} + x_1^{g_{12}} x_2^{g_{22}} + \ldots x_n^{g_{nm}}$. In this example, computing element (211) accesses exponents $g_{11}$ and $g_{21}$ from memory device (222) using bus (221), while computing element (213) accesses exponents $g_{12}$ and $g_{22}$ from memory device (222) using bus (223), and computing element (215) accesses exponent $g_{nm}$ from memory device (222) using bus (225). Computing element (211) computes the term $x_1^{g_{11}} x_2^{g_{21}}$ and then sends it to summing circuit (217) over bus (227); computing element (213) computes the term $x_1^{g_{12}} x_2^{g_{22}}$ and then sends it to summing circuit (217) over bus (229); and computing element (215) computes the term $x_n^{g_{nm}}$ and then sends it to summing circuit (217) over bus (231). Upon receiving the terms from the computing elements, summing circuit (217) sums the terms and places the resulting polynomial expansion on computer output (233).

It will be apparent to one of ordinary skill that computer (216) is capable of computing polynomials of the form given by Equation 1 which have a number of terms different from the above example, and polynomials whose terms are composed of data inputs different from those of the above example.

Memory device (222) stores exponent values which are used by the plurality of computing elements. Memory device (222) may store one or more blocks of exponent values, wherein each of the blocks corresponds to a different polynomial expansion.

Memory management unit (212) includes storing means (224) and determining means (214). Storing means (224) is operatively connected to memory device (222) by bus (218), and determining means (214) is operatively connected to storing means (224) by bus (220).

In accordance with the present invention, memory management unit (212) stores a plurality of blocks of exponent values in memory device (222) in a fashion which reduces the amount of memory space needed to store the plurality of blocks. Each of the blocks comprises exponent values which are used to compute a corresponding polynomial expansion. To reduce the needed amount of memory space, determining means (214) determines whether two or more of the blocks have exponents which are the same. If so, determining means (214) informs storing means (224) via bus (220). Storing means (224) in turn signals memory device (222) via bus (218) to store the blocks such that exponents which are the same, or common data elements, are stored at a single location in memory device (222).

Figure 10:
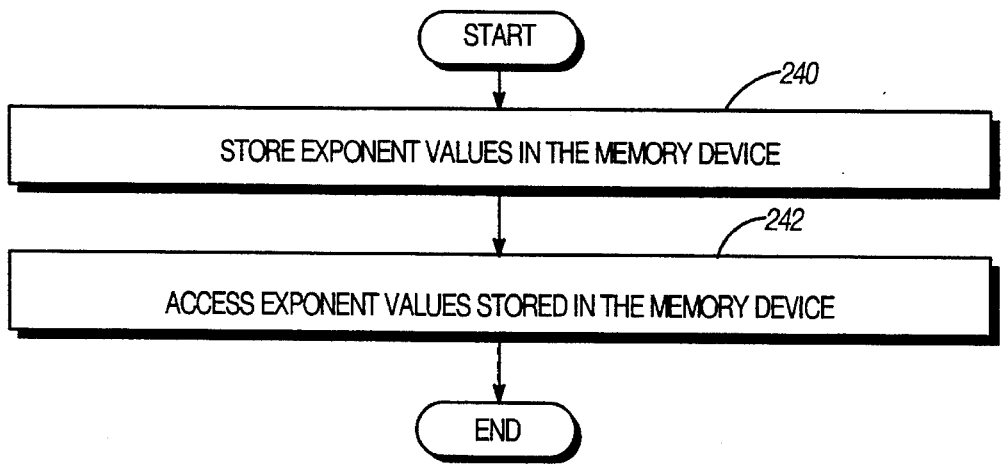
FIG. 10 shows a flow diagram of a method of memory management used in one embodiment of the present invention.

FIG. 10 shows a flow diagram of a method of memory management used in one embodiment of the present invention. In box (240), exponent values for a plurality of polynomial expansions are stored in the memory device by using a two-dimensional addressing scheme. The exponent values of each expansion are located in a data block which corresponds to the polynomial expansion. Thus, each of the polynomial expansions has an origin address, and the exponents of a polynomial expansion are located at addresses relative to the origin address of their respective expansion. If common exponent values, that is exponents which have the same value and which are located in two or more blocks, exist, then the common exponent values are stored a single two-dimensional address in the memory device.

Next, as shown by box (242), the computing elements access the plurality of exponent values stored in the memory device. This is accomplished by setting a pointer to the origin address of a polynomial expansion which is currently being computed. The exponent value located at the two-dimensional address is then retrieved from the memory device. The pointer is then incremented to point at another one of the exponent values of the polynomial expansion, and the steps of retrieving an exponent value and then incrementing the pointer are repeated until the last exponent of the polynomial has been retrieved.

Figure 11:
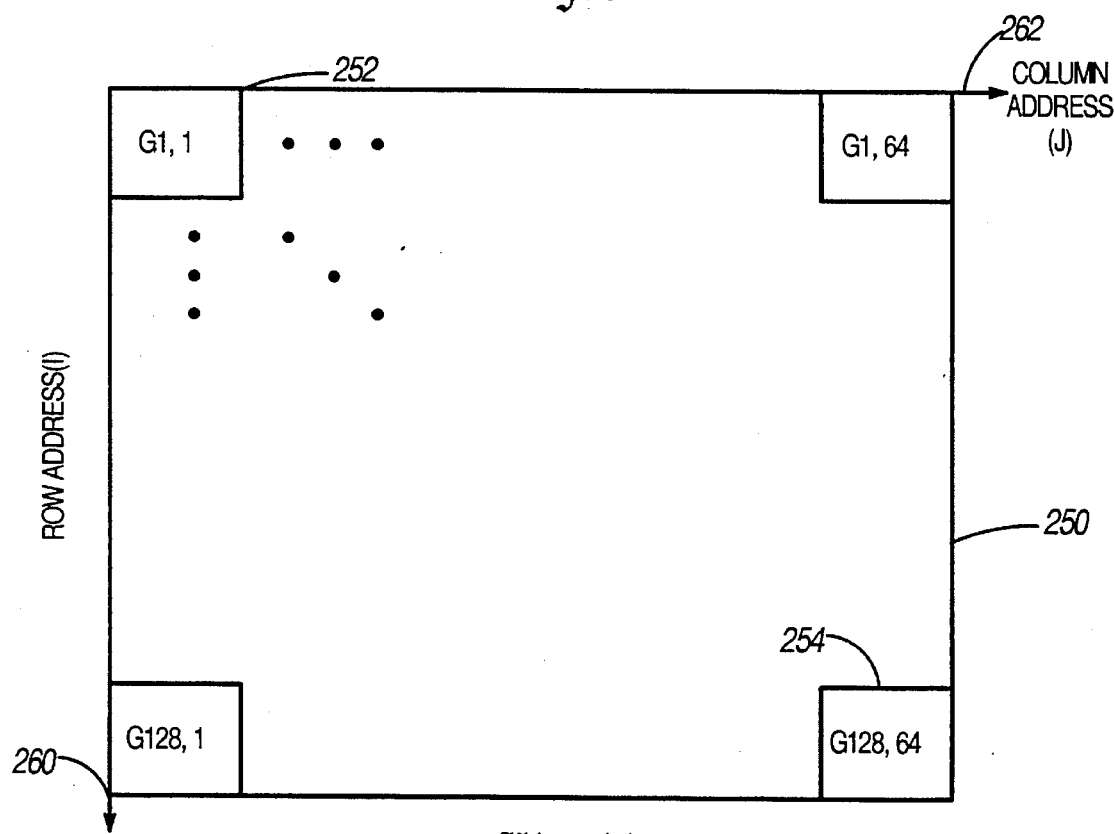
FIG. 11 illustrates an example of a data block which contains exponent values used in one embodiment of the present invention.

FIG. 11 illustrates an example of a data block which contains exponent values. In accordance with an embodiment, data block (250) includes a plurality of data elements, wherein each data element represents an exponent value as a two-bit digital word. First data element (252) represents exponent $g_{1,1}$ and last data element (254) represents exponent $g_{128, 64}$. The exponent values of data block (250) are used to compute polynomial expansions of the form given by Equation 1.

Each exponent is located at a two-dimensional address, (i, j), in a memory device, wherein i represents a row address and j represents a column address. Axis (260) represents values of the row address, while axis (262) represents values of the column address.

Data block (250) may be stored in memory device (3) of FIG. 9. In such a case, exponent values may be stored in memory device (222) such that each column address may point to exponent values that are accessed by a specific one of the plurality of computing elements of computer (216) of FIG. 9, and each row address may point to exponents that are applied to a specific one of the plurality of data inputs. For example, data block (250) may be used in computer (216) to provide exponent values for 64 computing elements and 128 data inputs.

Although FIG. 11 shows a data block which has 128 row addresses and 64 column addresses, and 128×64 exponent values, one of ordinary skill will understand that a data block may have any number of row and column addresses and any number of exponent values. Also, one skilled in the art will realize that when data block (250) is stored in memory device (222), the row and column addresses may be interchanged to point at exponents accessed by a specific computing element and to point at exponents corresponding to a specific data input, respectively.

SUMMARY

Thus there has been described herein a concept, as well as several embodiments including a preferred embodiment, of a method for storing data in a memory device which reduces the amount of memory space needed for the data.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. In a computer, a method for storing a plurality of computer-readable data blocks in a computer memory, the method comprising the following steps:
   (a) determining if a common computer-readable datum exists between two of the plurality of computer-readable data blocks, each of the plurality of computer-readable data blocks including a plurality of computer-readable computer program instructions usable by a computer program for directing the computer to perform a specific function; and
   (b) storing the plurality of computer-readable data blocks in the computer memory such that if the common computer-readable computer program instructions exists between the two of the plurality of data blocks, the common computer-readable computer program instructions of the two of the plurality of computer-readable data blocks is stored in a single area in the computer memory.

2. The method of claim 1 wherein each of the plurality of computer-readable computer program instructions is a digital word which is n bits in length, wherein n is an integer.

3. The method of claim 2 wherein n is two.

4. The method of claim 1 wherein each of the plurality of computer-readable computer program instructions is accessible using an n-dimensional address, wherein n is an integer.

5. The method of claim 4 wherein n is two.

6. The method of claim 1 wherein each of the plurality of computer-readable computer program instructions corresponds to an exponent in a polynomial expansion.

7. The method of claim 6 wherein the polynomial expansion has the form:

$$y = \sum_{i=1}^{m} x_1^{g_{1i}} x_2^{g_{2i}} \ldots x_n^{g_{ni}}$$

wherein y represents a dependent variable;
wherein i, m, and n are integers;
wherein $x_1, x_2, \ldots, x_n$ represent independent variables; and
wherein $g_{1i}, \ldots, g_{ni}$ represent the exponents for the ith term in the expansion and which are applied to the independent variables.

8. The method of claim 1 wherein steps (a) and (b) are repeated for a plurality of pairs of the computer-readable data blocks.

9. A method for storing a plurality of data blocks in a memory device, each of the plurality of data blocks having an origin address and a plurality of addressable data elements, and each of the plurality of data elements having an address which is relative to the origin address, the plurality of data blocks having a first and second data block, the method comprising the following steps:

(a) assigning origin addresses to the first data block and the second data block such that at least one of the plurality of data elements of the second data block has the same address as at least one of the plurality of data elements of the first data block;

(b) determining whether the at least one of the plurality of data elements of the first and second data blocks having the same address are equal;

(i) if so, creating an overlap record which includes the origin address of the second data block and the number of common data elements between the first and second data blocks;

(ii) if not, proceeding to step (c)

(c) changing the origin address of the second data block;

(d) repeating step (b)–(c) until a greatest number of common data elements is found;

(e) storing the first data block in the memory device at the origin address assigned in step (a); and (f) storing the second data block in the memory device at the origin address given by the overlap record with the greatest number of common elements.

10. The method of claim 9 wherein each of the data elements is a digital word which is n bits in length, wherein n is an integer.

11. The method of claim 10 wherein n is two.

12. The method of claim 9 wherein each of the plurality of data elements is accessible using a n-dimensional address, wherein n is an integer.

13. The method of claim 12 wherein n is two.

14. The method of claim 9 wherein each of the plurality of data elements corresponds to an exponent in a polynomial expansion.

15. The method of claim 14 wherein the polynomial expansion has the form:

$$y = \sum_{i=1}^{m} x_1^{g_{1i}} x_2^{g_{2i}} \ldots x_n^{g_{ni}}$$

wherein y represents a dependent variable;

wherein i, m, and n are integers;

wherein $x_1, x_2, \ldots, x_n$ represent independent variables; and wherein $g_{1i}, \ldots, g_{ni}$ represent the exponents for the ith term in the expansion and which are applied to the independent variables.

16. A method for storing a sequence of data blocks in a memory device, each of the data blocks having a plurality of addressable data elements, each of the plurality of data elements having an address which is relative to an origin address, the method comprising the following steps:

(a) assigning origin addresses to a first data block and a second data block such that at least one of the plurality of data elements of the second data block has a same address as at least one of the plurality of data elements of the first data block;

(b) determining whether at least one of the plurality of data elements of the first and second data blocks having the same address are equal;

(i) if so, creating an overlap record which includes the origin addresses of the first data block and the second data block and a number representative of common data elements between the first and second data blocks;

(c) changing the origin address of the second data block;

(d) repeating steps (b)–(c) until a greatest number of common data elements is found;

(e) defining an aggregate data block which includes the first data block and the second data block having origin addresses given by the overlap record with the greatest number of common data elements; and (f) determining if there is another data block in the sequence of data blocks;

(i) if so, substituting the aggregate data block for the first data block and a next data block in the sequence for the second data block and returning to step (a);

(ii) if not, storing the aggregate data block in the memory device.

17. The method of claim 16 wherein the sequence of data blocks is ordered according to the plurality of data elements in at least one of the sequence of data blocks.

18. The method of claim 17 wherein a larger data block has a position in the sequence ahead of data blocks having fewer data elements than the larger data block.

19. The method of claim 16, wherein step (f) includes the following sub-steps:

(f) determining if there is another data block in the sequence of data blocks;

(ii) if not, recording the size of the aggregate data block;

wherein the method further includes the following steps:

(g) repeating steps (a)–(f) for each permutation of the sequence of data blocks; and (h) storing in the memory device the aggregate data block having a smallest size.

20. The method of claim 16 wherein each of the data elements is a digital word which is n bits in length, wherein n is an integer.

21. The method of claim 20 wherein n is two.

22. The method of claim 16 wherein each of the plurality of data elements is accessible using a n-dimensional address, wherein n is an integer.

23. The method of claim 22 wherein n is two.

24. The method of claim 16 wherein each of the plurality of data elements corresponds to an exponent in a polynomial expansion.

25. The method of claim 16 wherein the polynomial expansion has the form:

$$y = \sum_{i=1}^{m} x_1^{g_{1i}} x_2^{g_{2i}} \ldots x_n^{g_{ni}}$$

wherein y represents a dependent variable;

wherein i, m, and n are integers;

wherein $x_1, x_2, \ldots, x_n$ represent independent variables; and wherein $g_{1i}, \ldots, g_{ni}$ represent the exponents for the ith term in the expansion and which are applied to the independent variables.

26. A method of using a memory device to store a plurality of exponent values in a computer that includes a plurality of computing elements, which computer is usable to compute a plurality of polynomial expansions that utilize the plurality of exponent values, wherein each of the polynomial expansions has the form:

$$y = \sum_{i=1}^{m} x_1^{g_{1i}} \, x_2^{g_{2i}} \ldots x_n^{g_{ni}}$$

wherein y represents an output of the computer;

wherein i, m, and n are integers;

wherein $x_1, x_2, \ldots, x_n$ represent data inputs to the computer; and wherein $g_{1i}, \ldots, g_{ni}$ represent exponent values for the ith term in a polynomial expansion and are applied to the data inputs, wherein each of the computing elements computes a term in the polynomial expansion, the method comprising the following steps:

(a) storing the plurality of exponent values at addressable locations in the memory device using a two-dimensional address such that if a common exponent value exists between a pair of polynomial expansions, the common exponent value is stored at a single location in the memory device, and such that each of the plurality of polynomial expansions has a two-dimensional origin address, wherein the plurality of exponent values are storable in the memory device at the addressable locations contiguous to origin addresses of corresponding ones of the polynomial expansions; and (b) accessing the plurality of exponent values corresponding to a respective one of the polynomial expansions by;

(i) setting a pointer to the two-dimensional origin address of the respective one of the polynomial expansions and retrieving from the memory device a first exponent value that is located at the two-dimensional address given by the pointer, wherein the two-dimensional address has a first component which corresponds to a receiving one of the plurality of computing elements which receives the exponent value being retrieved and a second component which corresponds to one of the data inputs to the computer;

(ii) incrementing the pointer to give the two-dimensional address of a second exponent value; and (iii) retrieving from the memory device the second exponent value located at the two-dimensional address given by the pointer.

27. In a computer which includes a computer memory, a memory management unit for storing a plurality of instruction blocks in the computer memory, the memory management unit comprising:

determining means for determining if a common computer-executable instruction exists between two of the plurality of instruction blocks, each of the instruction blocks having a plurality of computer-executable instructions usable by a computer program for directing the computer to perform a specific function; and storing means, operatively coupled to the computer memory and responsive to the determining means, for storing the plurality of instruction blocks in the computer memory such that if the common computer-executable instruction exists between the two of the plurality of instruction blocks, the common computer-executable instruction of the two of the plurality of instruction blocks is stored in a single area in the computer memory.

28. The memory management unit of claim 27 wherein each of the computer-executable instructions is a digital word which is n bits in length, wherein n is an integer.

29. The memory management unit of claim 28 wherein n is two.

30. The memory management unit of claim 27 wherein each of the plurality of computer-executable instructions is accessible using an n-dimensional address, wherein n is an integer.

31. The memory management unit of claim 30 wherein n is two.

32. The memory management unit of claim 27 wherein each of the plurality of computer-executable instructions is an exponent in a polynomial expansion.

33. The memory management unit of claim 32 wherein the polynomial expansion has the form:

$$y = \sum_{i=1}^{m} x_1^{g_{1i}} \, x_2^{g_{2i}} \ldots x_n^{g_{ni}}$$

wherein y represents a dependent variable;

wherein i, m, and n are integers;

wherein $x_1, x_2, \ldots, x_n$ represent independent variables; and wherein $g_{1i}, \ldots, g_{ni}$ represent the exponents for the ith term in the expansion and which are applied to the independent variables.

* * * * *